(12) United States Patent
Kubota (10) Patent No.: US 7,325,236 B2
(45) Date of Patent: Jan. 29, 2008

(54) ELECTRONIC DEVICE, APPARATUS USING THE SAME, AND METHOD OF READING OUT DATA

(75) Inventor: Yoshiyasu Kubota, Kanagawa (JP)

(73) Assignee: Sony Corporation (JP)

( * ) Notice: Subject to any disclaimer, the term of this patent is extended or adjusted under 35 U.S.C. 154(b) by 470 days.

(21) Appl. No.: 09/925,234

(22) Filed: Aug. 9, 2001

(65) Prior Publication Data

US 2002/0052982 A1 May 2, 2002

(30) Foreign Application Priority Data

Aug. 9, 2000 (JP) ............................. P2000-241321

(51) Int. Cl.
G06F 9/44 (2006.01)
G06F 3/00 (2006.01)
G06F 13/00 (2006.01)
G06F 13/10 (2006.01)

(52) U.S. Cl. ..................... 719/321; 719/327; 710/8; 710/301

(58) Field of Classification Search ............... 719/313, 719/321, 327; 710/8, 10, 301
See application file for complete search history.

(56) References Cited

U.S. PATENT DOCUMENTS 5,319,751 A 6/1994 Garney
5,860,083 A * 1/1999 Sukegawa .................... 711/103
6,009,480 A * 12/1999 Pleso ............................. 710/8
6,138,178 A * 10/2000 Watanabe ....................... 710/8
6,148,346 A * 11/2000 Hanson ....................... 719/321
6,574,588 B1 * 6/2003 Shapiro et al. ............... 703/24
6,832,379 B1 * 12/2004 Zeryck et al. ............... 719/327
7,058,563 B1 * 6/2006 Chrysanthakopoulos et al. 703/24

FOREIGN PATENT DOCUMENTS

EP 0 716 371 A2 6/1996

* cited by examiner

Primary Examiner—Li B. Zhen
(74) Attorney, Agent, or Firm—Lerner, David, Littenberg, Krumholz & Mentlik, LLP (57) ABSTRACT

A device, an apparatus using the device, and a method designed for performing operations such as automatic installation of driver software facilitate expansion of the existing functions of the apparatus. A microprocessing unit, a random access memory, an operation part, a read only memory or the like are mutually connected via a system bus and mounted in main equipment which is made up of a personal computer. A media controller is connected to the system bus of the main equipment. An electronic device is connected to the media controller as a medium for executing external memory, expanding the existing function or the like, the electronic device being provided with an Ethernet providing connection to external computer networks via a media side controller and a nonvolatile memory in which driver software data driving the Ethernet under respective environments is stored.

15 Claims, 5 Drawing Sheets

```
/ROOT/--+----/DRIVERS/ --+-- | WIN_CE. drv |
        |                |
        |                +-- | PALM_III. drv |
        |                |
        |                +-- | WIN_98. drv |
        |                |
        |                +-- | WIN_2K. drv |
        |
        +----/otherdier/---      . . . . . . .
        |
        :
```

FIG.5

ELECTRONIC DEVICE, APPARATUS USING THE SAME, AND METHOD OF READING OUT DATA

CROSS-REFERENCE TO RELATED APPLICATIONS

The present application claims priority from Japanese Priority Document JP 2000-241321, filed in the Japanese Patent Office on Aug. 9, 2000, the entire contents of which is incorporated herein by reference.

BACKGROUND OF THE INVENTION

This invention relates to an electronic device suitable for use in an apparatus detachably mounted with respect to main equipment executing optional functions, the apparatus using the device, and a method of reading out data. More particularly, it relates to an electronic device having a shape identical to a memory card or a semiconductor memory unit similar thereto, being connected to a connection part of any of these units and executing optional functions, an apparatus using the device, and a method of reading out data.

For example, there has been proposed an electronic device having the same shape as a memory card device detachably mounted with respect to main equipment or a semiconductor memory unit similar thereto, which is connected to the connection part of any of these memory units and executes optional functions. Namely, in such electronic devices, for example, provision of a connection function to a computer network or a communication function to the external world makes it possible to easily expand the scope of operation and use of the main equipment.

If such device is, for instance, combined with the main equipment comprising a personal computer to execute the aforementioned functions, it is necessary to install driver software on the personal computer end serving as the main equipment for executing the functions. Hence, driver software conventionally stored in a floppy disk or the like attached to the device is manually installed in the main equipment so as to execute the function by means of the driver software thus installed.

In this case, however, the driver software of this type very often relies on the so-called computer operating environment including the computer model and the operating system. Thus, different software may be used depending on the operating environment of the personal computer serving as the main equipment. Consequently, in the aforementioned installation procedure, it becomes necessary to carry out complicated work by determining the proper computer operating environment for a specific computer and selecting the proper software for that computer operating environment.

On the other hand, to reduce any complexity entailed in such work, take, for example, the case of an interface substrate for installation of an external memory unit, where the operating environment of the personal computer as the main equipment is fixed with such arrangements that automatically select the driver software for the external memory unit to be connected. However this unit may be effective for the existing function such as the external memory unit, but not for other functions whatsoever.

In addition, as in the case of "Microsoft Windows 98" (registered trademark of Microsoft Corporation, U.S.A.), what is used today is a system whereby the driver software of almost all commercially available equipment is built in the operating system so that when the equipment is connected, the driver software therein is put to use. This system is effective only with respect to equipment known when the operating system was formulated, and cannot be used for any other new equipment.

The present invention is made for purposes of resolving such a problem. That is, the present invention is intended to resolve the problem that, when an electronic device that can be detachably mounted to the main equipment is used to perform operations such as expansion of the existing function of the main equipment, conventional devices require such cumbersome work as driver software installation to execute an expanded function with regard to the main equipment, thus making it impossible to easily expand the existing function as described above.

SUMMARY OF THE INVENTION

There has been a need for an electronic device which, when mounted to main equipment, can execute any expanded function thereof simply by connecting to the main equipment without carrying out any additional work.

According to an aspect of the present invention, software data for a plurality of devices are stored in a data memory unit of an electronic device, the software data being operable to execute the expanded functions with regard to a plurality of computer operating environments. The stored driver software data is output from the data memory unit to the main equipment.

Furthermore, the software data may be stored in the data memory unit in terms of a file format. Keywords identifying the plurality of drivers and corresponding storage addresses at leaders of address spaces of the data memory unit may be stored and, further, the software data may be stored in the storage addresses corresponding to the keywords.

Still further, according to another aspect of the present invention, there is provided an electronic apparatus including a main apparatus having a specific computer operating environment and an electronic device detachably mounted to the main apparatus for exchanging optional data with the main apparatus and for executing optional functions. The electronic device includes a data memory unit and software data for a plurality of drivers stored in the data memory unit, the software data being operable to execute the optional functions with regard to a plurality of computer operating environments, respectively. An identification unit in the main apparatus identifies the software data stored in the data memory unit, and obtains a selected one of the software data corresponding to the specific computer operating environment.

Additionally, the software data may be stored in the data memory unit of the electronic device using a file format, and the selected one of the software data corresponding to the specific computer operating environment may be identified and obtained from the data memory unit using the file format.

Alternatively, a plurality of driver keywords may be stored at leaders of address spaces of the data memory unit, so that the selected one of the software data corresponding to the specific computer operating environment may be identified and obtained from the data memory unit based on the keywords.

Moreover, according to still another aspect of the present invention, in a main apparatus having an electronic device detachably mounted thereto, the main apparatus having a specific computer operating environment, there is provided a method of obtaining driver software data operable to execute the optional functions of the electronic device. The method includes storing in the electronic device software data for a plurality of drivers, the software data being operable to execute the optional functions with regard to a plurality of computer operating environments, respectively; identifying the software data stored in the electronic device; and transferring a selected one of the software data corresponding to the specific computer operating environment from the electronic device to the main apparatus.

In addition, the software data may be stored in the electronic device using a file format, and the selected one of the software data corresponding to the specific computer operating environment may be transferred based on the file format.

Further, the software data may be identified by using keywords identifying the plurality of drivers which are stored at leaders of address spaces in the electronic device, and the selected one of the software data may be identified on the basis of the keywords.

When operations such as expansion of the existing function of the main equipment are performed, e.g., by means of using the electronic device detachably mounted to the main equipment, conventional devices require complicated work, for instance, at the time of installing the driver software for executing an expansion function with regard to the main equipment, making it difficult to expand the aforementioned function or the like with ease, whereas the electronic device, the apparatus using the electronic device, and the method of reading out data according to the present invention are able to resolve these problems easily. Accordingly, the present invention stores in the data memory unit of the electronic device software data for a plurality of devices for executing respective functions with regard to a plurality of computer operating environments, the driver software data thus stored being capable of being output to the main equipment, thereby enabling the installation of driver software to be automatically carried out and facilitating operations such as expanding the existing function of the main equipment simply by connecting the electronic device thereto.

BRIEF DESCRIPTION OF THE DRAWINGS

The above and other objects and advantages will become apparent from the following detailed description when read in conjunction with the accompanying drawings wherein.

DETAILED DESCRIPTION

An electronic device according to a first preferred embodiment of the present invention is detachably mounted to main equipment, exchanging optional data therewith and executing optional functions. Preferably, the device includes a data memory unit in which a plurality of driver software for executing respective functions with regard to a plurality of computer operating environments is stored, and a device which outputs the plurality of driver software data stored in the data memory unit to the main equipment.

Also, an apparatus according to a second preferred embodiment of the present invention uses an electronic device which is detachably mounted thereto, to exchange optional data therewith and execute optional functions thereof. The apparatus preferably includes a device which identifies a plurality of driver software data stored in a data memory unit of the electronic device for executing respective functions with regard to a plurality of computer operating environments and fetches proper driver software data corresponding to a specific computer operating environment thereof.

Further, a method of reading out data according to a third preferred embodiment of the present invention fetches driver software data from an electronic device which is detachably mounted to main equipment to exchange optional data therewith and execute optional functions thereof, and a data memory unit of which stores a plurality of driver software data to execute respective functions with regard to a plurality of computer operating environments. The device includes a device which identifies the plurality of driver software data for executing functions and fetches the proper driver software data corresponding to a specific computer operating environment thereof.

Figure 1:
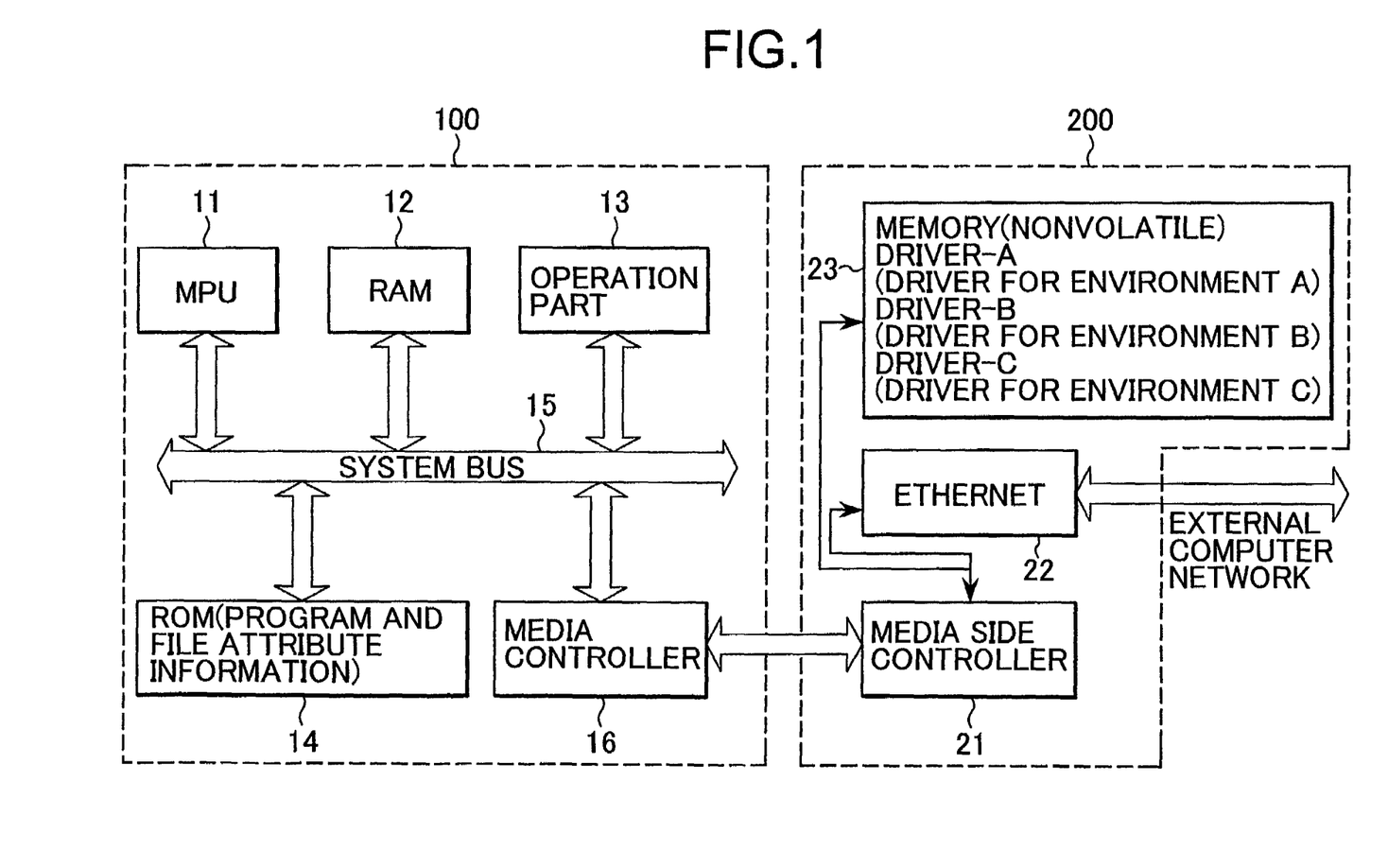
FIG. 1 is a schematic diagram of an electronic device and main equipment according to a preferred embodiment of the present invention.

Preferred embodiments of the present invention will now be described with reference to the drawings. FIG. 1 is a block diagram showing an electronic device of the first preferred embodiment according to the present invention and a configuration of the apparatus using the electronic device of the second preferred embodiment according to the present invention.

On the left side of FIG. 1 is shown main equipment 100 consisting of a personal computer as an example of the apparatus using the electronic device. The main equipment 100 is made up of a microprocessing unit (MPU) 11, a random access memory (RAM) 12, an operation part 13, a read only memory (ROM) 14 in which a program, attribute information of a file, or the like are stored, or the like, all mutually connected via a system bus 15.

And to the system bus 15 of the main equipment 100 is connected and provided a media controller 16 to which an electronic device 200 is connected as a medium for executing external memory, expanding the existing function or the like. Namely, the media controller 16 is provided with an interface (not illustrated) which connects to the electronic device 200, while memory driver software is provided for exchanging data at least with the electronic device 200 operating as an external memory unit.

Figure 2:
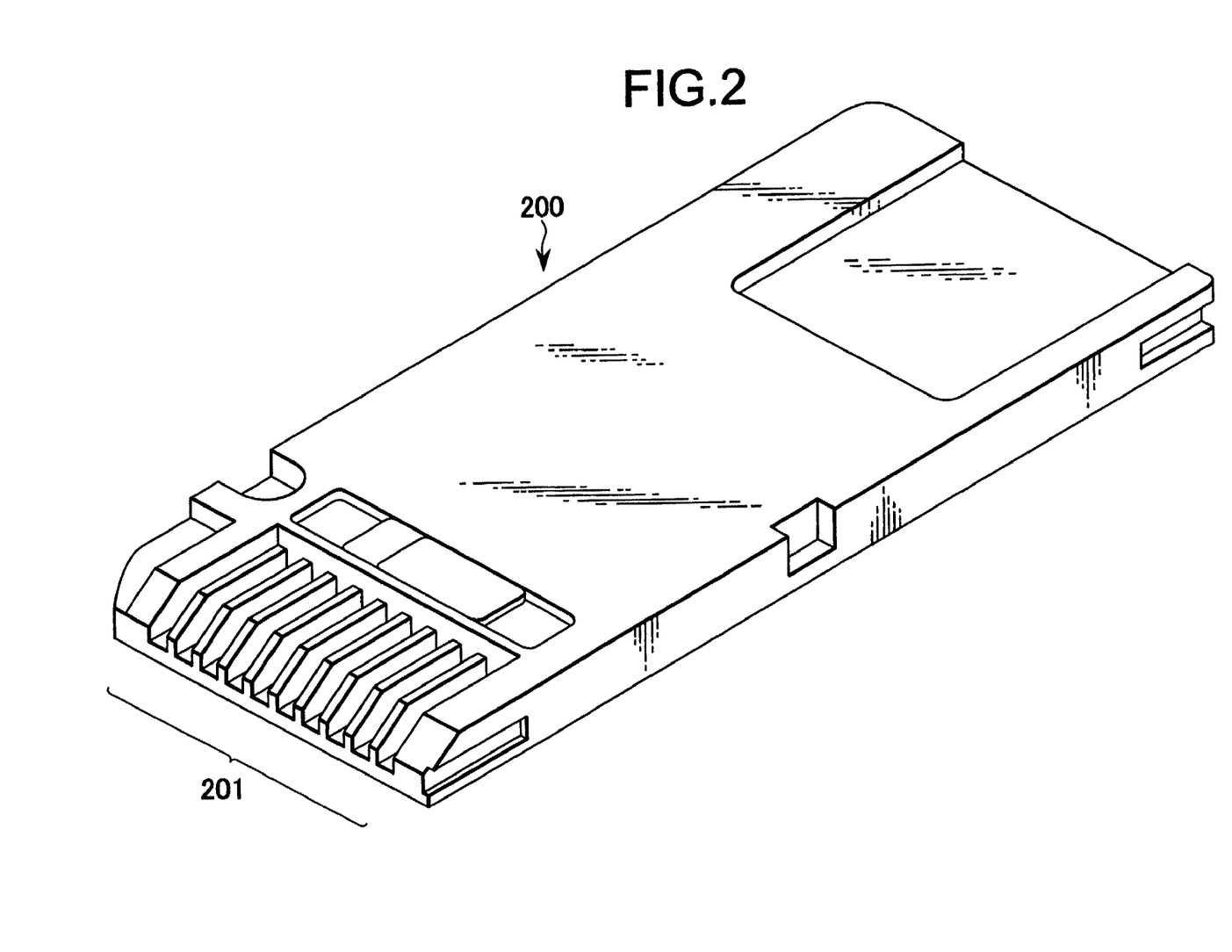
FIG. 2 is an external view of an electronic device according to the preferred embodiment of the present invention.

On the right side of the drawing is shown the electronic device 200, which has the same shape as a so-called memory card or a semiconductor memory unit similar thereto, e.g., as shown in FIG. 2. Further, the electronic device 200 is detachably mounted to the main equipment 100, being electrically connected to an interface (not illustrated) of the media controller 16 via contacts 201 formed at its end.

And an input/output functional block (Ethernet) 22, e.g., rendering connection to an external computer network, is provided to the electronic device 200 via a media side controller 21 connected to the foregoing contacts 201. Also, a data memory unit, e.g., a nonvolatile memory 23, is provided in the electronic device 200. Furthermore, in this memory 23 is stored software data of drivers (Driver-A, Driver-B, Driver-C or the like) which drive the input/output functional block (Ethernet) 22 under respective environments.

Namely, driver software data corresponding to all operating systems to be installed in the main equipment 100 which may be connected thereto is stored in the memory 23.

The memory 23 is connected to the media controller 16 of the main equipment 100 via the media side controller 21, whereas driver software data stored therein is selected and read out by the media controller 16. Thereby, the input/output functional block (Ethernet) 22 provided at the electronic device is driven according to control from the main equipment 100.

Figure 3:
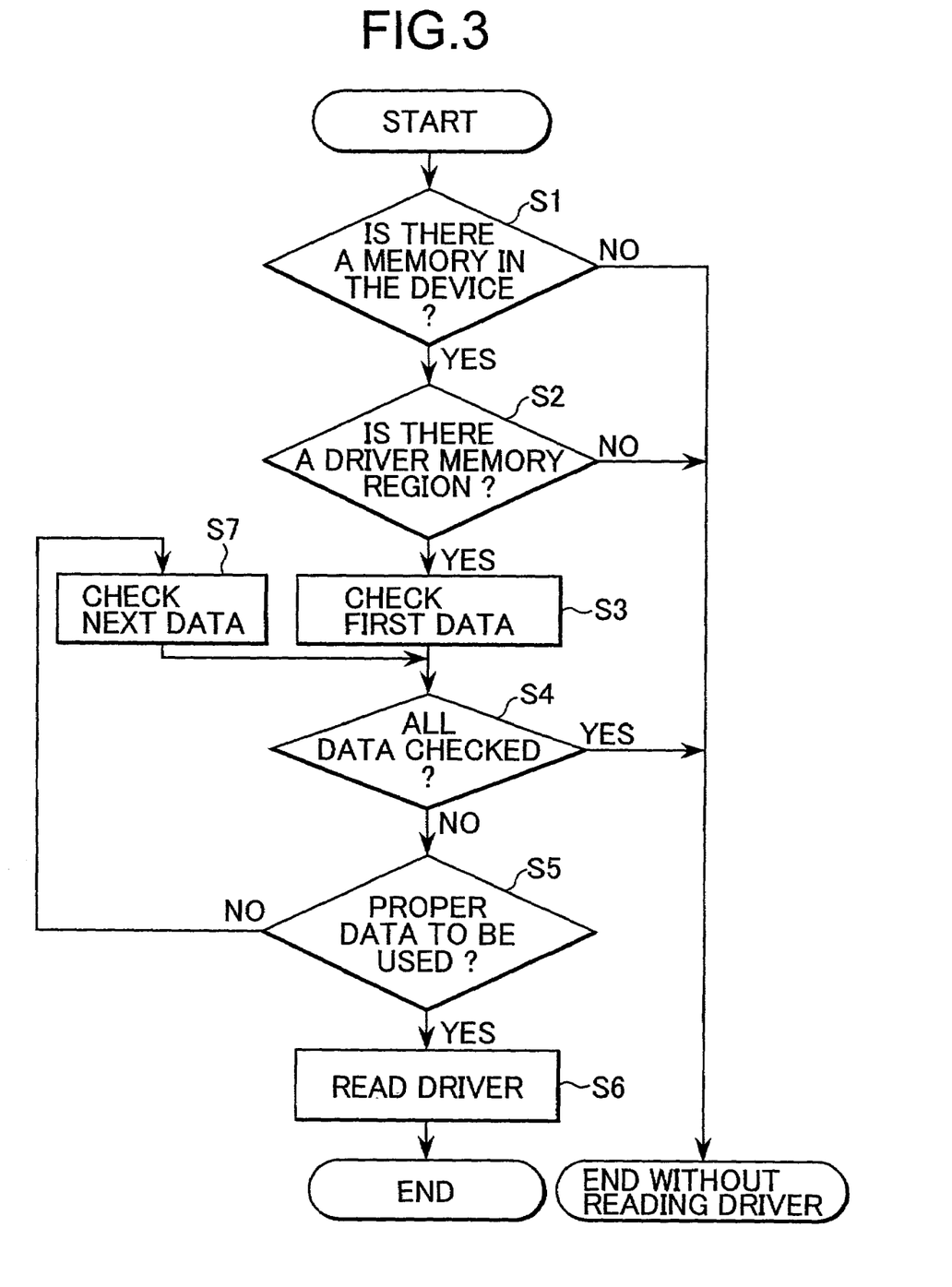
FIG. 3 is a flowchart of a method of reading out data according to the preferred embodiment of the present invention.

FIG. 3 shows a flowchart explaining the method of reading out data according to the third preferred embodiment of the present invention.

That is, in FIG. 3, the processing starts, for instance, by connecting the electronic device 200 to the main equipment 100. First, in step S1, it is determined whether the electronic device 200 has the memory 23; if the answer is "No" in step S1, the processing terminates. When it is determined that the electronic device 200 has the memory 23 at step S1, the process goes to step S2 in which it is determined whether the memory 23 has a memory region of driver software data. If the result is "No", the processing terminates as is.

Further, when it is determined that there is a memory region in the memory 23 in step S2, the process goes to step S3 where the first data is checked. In step S4, whether all the data in the memory region has been checked is determined, and when the checking of all the data has been completed, i.e., "Yes" in step S4, the process terminates as is. If the checking of all the data has not yet been completed, i.e., "No" in step S4, the process goes to step S5, in which it is determined whether the data checked is proper data to be used with the specific computer operating environment of the main equipment 100.

If the data checked in step S5 is the proper data to be used with the specific computer operating environment of the main equipment 100, the process is terminated after the driver software data fetched from the memory region of the memory 23 in step S6 is read by the media controller 16 of the main equipment 100. Also, when it is determined that the data checked is not the proper data, i.e., "No" in step S5, the next data is checked in step S7 and the process goes back to step S4.

In this manner, out of the driver software data stored in the memory region of the memory 23 of the electronic device 200, the proper driver software data for use with the specific computer operating environment of the main equipment 100 is selected and read. The thus-read driver software is used to drive the input/output functional block (Ethernet) 22 provided in the electronic device 200 following the control exerted by the main equipment 100.

Accordingly, in these preferred embodiments, a plurality of driver software data for executing respective functions with regard to a plurality of computer operating environments is stored in the data memory unit of the electronic device, and the thus-stored driver software data is arranged to be output to the main equipment, thereby enabling operations such as driver software installation to be automatically carried out and facilitating expansion of the existing function simply by connecting the electronic device.

In a case where the expansion of the main equipment function is to be implemented by using the electronic device detachably mounted to the main equipment, currently available devices require cumbersome work involving installation of driver software to expand the existing function with respect to the main equipment, making it impossible to carry out the aforementioned expansion of the existing function with ease, while, on the other hand, the preferred embodiments according to the present invention can easily resolve these difficulties.

Namely, according to the foregoing configuration, no further work than that of installing hardware is required when the existing function is to be newly expanded, additionally preventing mistakes which may occur in installing a wrong combination of a device for expanding the existing function and a driver therefor, with a resultant operation failure. Moreover, when the main equipment is designed by taking this function into consideration, it is unnecessary to continuously store the driver when a function expander is not in use, thereby saving the amount of memory in the equipment and eliminating any chance of malfunction due to a driver combination.

Figure 4:
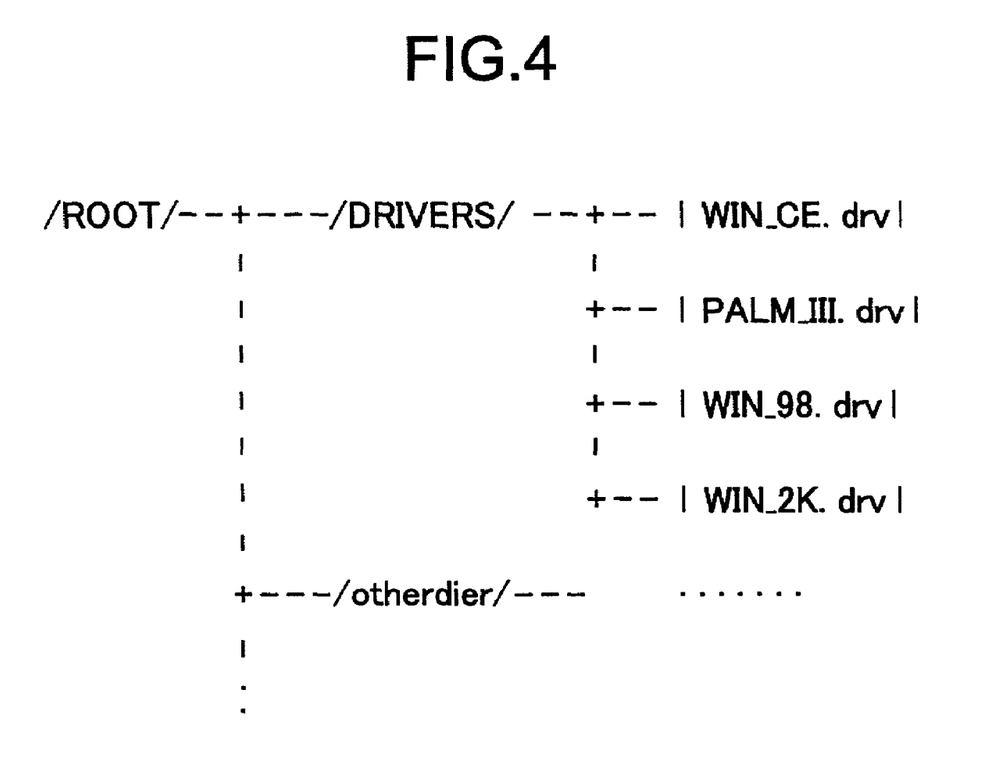
FIG. 4 is a diagram explaining the method of reading out data.

In the foregoing preferred embodiment, the driver software data to be stored in the memory 23 may be stored, for example, by using a file format shown in FIG. 4. Characters placed between "/" in FIG. 4 indicate a directory, while those placed between "|" indicate a file name. Hence, in FIG. 4, under the "ROOT" directory, the "DRIVERS" directory is set up, and each file is set up in the "DRIVERS" directory.

When a storage operation is made by using the file format, in checking to see whether or not there is a memory region in the memory 23 in step S2 mentioned above, presence of the "DRIVERS" directory is checked, and in identifying the driver corresponding to steps S4 through S7, it may be determined in terms of the file name in the "DRIVERS" directory. In this case, the file name may be easily identified by making up the file name, for example, through addition of an extension ".drv" to the name of the operating system as shown.

Figure 5:
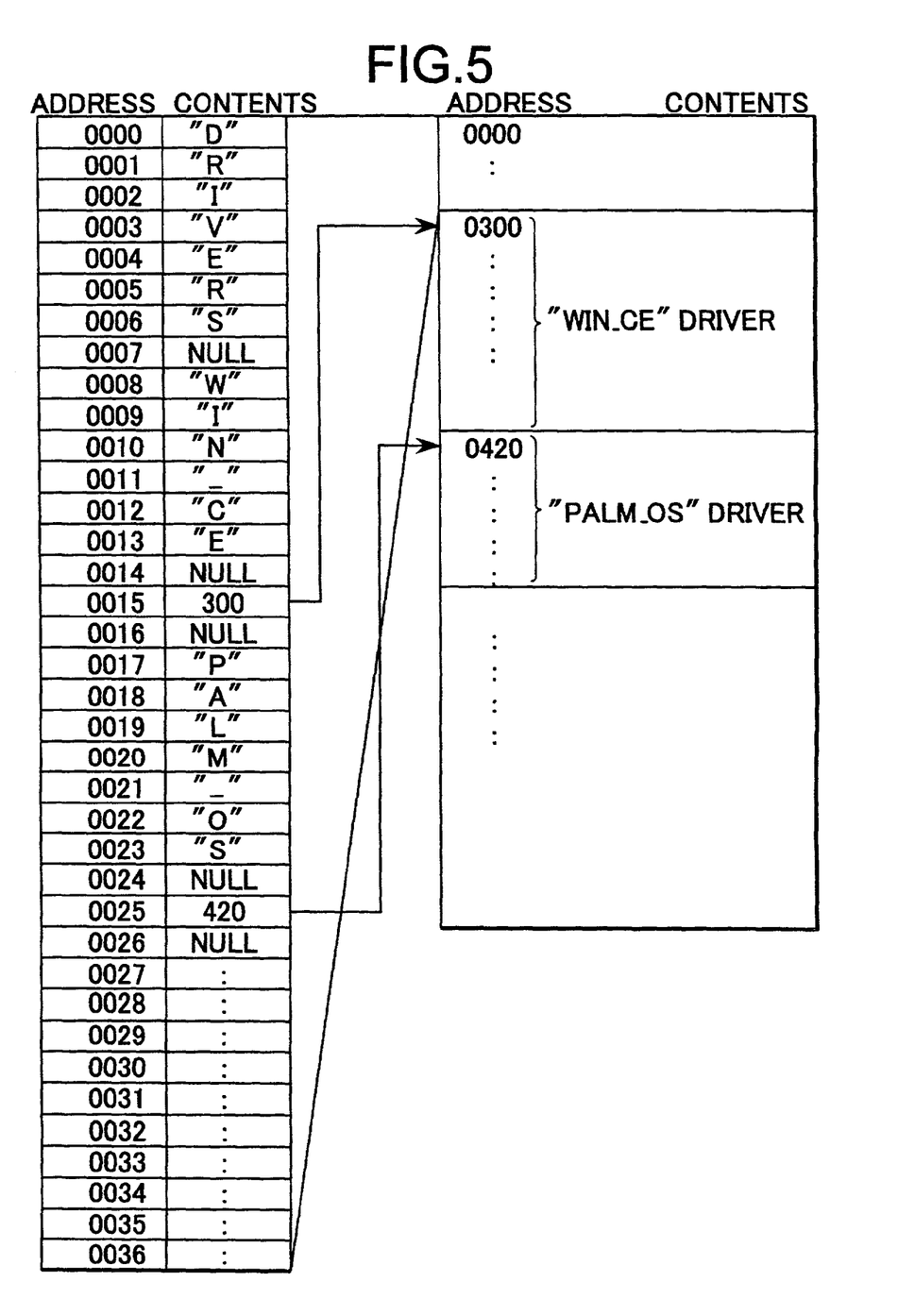
FIG. 5 is a diagram explaining the method of reading out data.

Further, in the foregoing preferred embodiment, driver software data to be stored in the memory 23 may be stored, for example, as shown in FIG. 5, at the leader of the address in a character string of "D""R""I""V""E""R""S" which serves as the keyword. Moreover, the addresses corresponding to the respective driver names which serve as the keywords are stored, whereas from these stored addresses, each driver software data is committed to storage.

When these keywords are used to conduct the storage operation, in checking to see whether there is the memory region in step S2 mentioned above, presence of the keyword "DRIVERS" is checked, and in identifying the driver corresponding to steps S4 through S7, it may be determined by identifying respective driver names. Note that identification of the driver names may be facilitated, for example, by using the operating system name as shown in the drawing.

The preferred embodiment has been described above for a case where only a single function of the Ethernet (I/O functional block) which performs connection to an external computer network is set up as an example, whereas a plurality of functions may be set up in the electronic device 200. Insofar as such electronic device 200 is concerned, for instance, by selecting one of the plurality of functions for the main equipment 100, it is possible to implement the selected function.

Methods of installing driver software in that case may include a method of installing driver software for a function when that function is selected or a method of installing in advance the driver software corresponding to respective functions. Note that when the storage in the memory 23 takes the file format of FIG. 4, directories may be set up in terms of function, and when the keywords of FIG. 5 are used, the keywords in terms of function may be set up to execute processing.

Furthermore, in the preferred embodiment mentioned above, in the case where the checking procedure is terminated without reading the driver as a result of determinations in steps S1, S2, and S4, installation of the necessary driver by virtue of the conventional method may be carried out to perform operations such as expansion of the existing function. In that case, first, the main equipment 100 retrieves beforehand drivers held in the memory unit, and if the corresponding driver is located in this process, that driver is used, while if not located, a step may be taken to urge the user to introduce the necessary driver.

In this manner, according to the electronic device described above, there is provided an electronic device detachably mounted to main equipment, exchanging optional data therewith and executing optional functions, whereas it is equipped with a data memory unit wherein a plurality of driver software data for executing respective functions with regard to a plurality of computer operating environments is stored, whereupon, by providing a device which outputs the driver software data stored in the data memory unit to the main equipment, operations such as automatic installation of the driver software may be carried out, thus facilitating expansion of the existing function of the main equipment simply by connecting the electronic device thereto.

Additionally, according to the apparatus using the aforementioned electronic device, there is provided an apparatus to which an electronic device is detachably mounted, and which uses the electronic device, carrying out an exchange of optional data therewith and executing optional functions thereof, whereupon, by providing a device which identifies a plurality of driver software data for executing respective functions with regard to a plurality of computer operating environments stored in the data memory unit thereof and fetches the proper driver software data corresponding to the specific computer operating environment, operations such as driver software installation may be automatically carried out, thus facilitating expansion of the existing function of the apparatus simply by connecting the electronic device thereto.

Further, according to the aforementioned method of reading out data, there is provided a method of reading out data which fetches the driver software data from the electronic device detachably mounted to the main equipment, exchanging optional data with the main equipment and executing optional functions, the data memory unit of the electronic device storing a plurality of driver software data for executing respective functions with regard to a plurality of computer operating environments, whereupon, by providing a device which identifies a plurality of driver software data for executing the functions and fetches the proper driver software data corresponding to the specific computer operating environment, operations such as installation of driver software may be automatically carried out, thus facilitating expansion of the existing function of the main equipment simply by connecting the electronic device thereto.

Although the invention herein has been described with reference to particular embodiments, it is to be understood that these embodiments are merely illustrative of the principles and applications of the present invention. It is therefore to be understood that numerous modifications may be made to the illustrative embodiments, including modifications to the shape, size and arrangement of parts thereof, and that other arrangements may be devised without departing from the spirit and scope of the present invention as defined by the appended claims.

The invention claimed is:

1. An electronic device adapted to be detachably mounted to main equipment for providing optional data to the main equipment and permitting optional functions to be executed, the electronic device comprising:

a data memory unit including a plurality of address spaces;

software data stored in the data memory unit, the software data including a plurality of portions stored at respective storage addresses of the address spaces, each portion containing driver data corresponding to a specific computer environment selected from a plurality of different specific computer operating environments, for permitting execution of a respective one of a plurality of separately selectable functions in accordance with the specific computer operating environment of a main equipment selected from a plurality of main equipments, the storage addresses corresponding to keywords identifying the plurality of functions being stored at leaders of the address spaces, each main equipment being operable in accordance with a respective one of the plurality of different specific computer operating environments;

an interface unit in form of a memory card interface for transfer of data from the electronic device to the selected main equipment and from the selected main equipment to the electronic device; and an output unit operable, upon mounting the electronic device to the selected main equipment and selecting a first function from among said plurality of separately selectable functions, to output a first portion of said portions of the software data containing said driver data for said selected first function and corresponding to said selected specific computer operating environment from the data memory unit to the selected main equipment through said interface unit for installation of said driver data in the selected main equipment to permit said selected first function to be executed using the electronic device while the electronic device is mounted to the selected main equipment, and upon mounting the electronic device to the selected main equipment and selecting a second function from among said plurality of separately selectable functions, to output a second portion of said portions of the software data containing said driver data for said selected second function and corresponding to said selected specific computer operating environment from the data memory unit to the selected main equipment through said interface unit for installation of said driver data in the selected main equipment to permit said selected second function to be executed using the electronic device while the electronic device is mounted to the selected main equipment.

2. The electronic device as claimed in claim 1, wherein the software data are stored in the data memory unit using a file format.

3. The electronic device as claimed in claim 1, wherein said plurality of functions includes at least one function which is not a memory function.

4. The electronic device as claimed in claim 1, wherein said plurality of functions includes a network interface for providing connection between the main equipment and an external computer network.

5. The electronic device as claimed in claim 4, wherein said network interface includes an Ethernet interface.

6. An electronic apparatus, comprising:

a main apparatus selected from a plurality of main apparatuses, each main apparatus being operable in accordance with a respective one of a plurality of different specific computer operating environments; and an electronic device detachably mounted to the selected main apparatus for exchanging optional data with the selected main apparatus, the electronic device including a data memory unit including a plurality of address spaces, and software data stored in the data memory unit, the software data including a plurality of portions stored at respective storage addresses of the address spaces, each portion containing driver data corresponding to a specific computer environment selected from the plurality of different specific computer operating environments, for permitting execution of a plurality of separately selectable functions in accordance with the specific computer operating environment of the selected main apparatus when the electronic device is mounted to the selected main apparatus, the storage addresses corresponding to keywords identifying the plurality of functions being stored at leaders of the address spaces, an interface unit in form of a memory card interface unit for transfer of data from the electronic device to the selected main apparatus and from the selected main apparatus to the electronic device, the selected main apparatus including an identification unit operable to identify a first portion stored in the data memory unit of the electronic device corresponding to a first selected function on the basis of the keywords, and to obtain the first portion corresponding to the first selected function and corresponding to the specific computer operating environment of the selected main apparatus from the electronic device through the interface unit upon selecting the first function from among the plurality of functions and to install the obtained first portion on the selected main apparatus, such that the selected first function can be executed using the electronic device while the electronic device is mounted to the selected main apparatus, and to obtain a second portion corresponding to a second selected function and corresponding to the specific computer operating environment of the selected main apparatus from the electronic device through the interface unit upon selecting the second function from among the plurality of functions and to install the obtained second portion on the selected main apparatus, such that the selected second function can be executed using the electronic device while the electronic device is mounted to the selected main apparatus.

7. The electronic apparatus as claimed in claim 6, wherein the software data are stored in the data memory using a file format, and the identification unit is operable to identify the portion corresponding to the selected function using the file format.

8. The electronic apparatus as claimed in claim 6, wherein said plurality of functions includes at least one function which is not a memory function.

9. The electronic apparatus as claimed in claim 6, wherein said plurality of functions includes a network interface for providing connection between the main equipment and an external computer network.

10. The electronic apparatus as claimed in claim 9, wherein said network interface includes an Ethernet interface.

11. A method of obtaining driver software data by a main apparatus from an electronic device detachably mounted thereto, the main apparatus selected from a plurality of main apparatuses, each main apparatus being operable in accordance with a respective one of a plurality of different specific computer operating environments, to enable an optional function to be executed while the electronic device is mounted to the selected main apparatus, the method comprising:
a) storing a plurality of portions of driver software data at respective storage addresses corresponding to keywords at leaders of address spaces in the electronic device the storage addresses corresponding to the keywords identifying the plurality of portions of driver software data, each portion for enabling execution of a respective one of a plurality of separately selectable functions including first and second separately selectable functions in accordance with the respective specific computer operating environment of the selected main apparatus when the electronic device is mounted to the selected main apparatus;
b) selecting one of the first and second functions from the plurality of separately selectable functions;
c) when the first function is selected, identifying, on the basis of the keywords, a first portion of the software data corresponding to the selected first function and corresponding to the specific computer operating environment of the selected main apparatus from among the plurality of portions corresponding to the respective functions and respective specific computer operating environments, and when the second function is selected, identifying a second portion of the software data corresponding to the selected second function and corresponding to the specific computer operating environment of the selected main apparatus from among the plurality of portions corresponding to the respective functions and respective specific computer operating environments;
d) transferring the identified portion of the software data from the electronic device to the selected main apparatus through an interface unit having a form of a memory card interface; and
e) installing the identified portion of the software data on the selected main apparatus to enable execution of the selected function using the electronic device while the electronic device is mounted to the selected main apparatus.

12. The method of obtaining driver software data as claimed in claim 11, wherein the step of storing includes storing the driver software data in the electronic device using a file format, and the step of transferring transfers the identified portion of the driver software data based on the file format.

13. The method of obtaining driver software data as claimed in claim 11, wherein said plurality of functions includes at least one function which is not a memory function.

14. The method of obtaining driver software data as claimed in claim 11, wherein said plurality of functions includes a network interface for providing connection between the main equipment and an external computer network.

15. The method of obtaining driver software data as claimed in claim 14, wherein said network interface includes an Ethernet interface.

* * * * *